Ac`

United States Patent
Bremer et al.

(10) Patent No.: US 7,272,215 B2
(45) Date of Patent: Sep. 18, 2007

(54) AUTOMATIC RAPID SWITCHING BETWEEN DSL SERVICE AND POTS OVER LOADED LOOPS

(75) Inventors: Gordon F. Bremer, Largo, FL (US); Thomas J. Bingel, Pinellas, FL (US)

(73) Assignee: Paradyne Corporation, Largo, FL (US)

( * ) Notice: Subject to any disclaimer, the term of this patent is extended or adjusted under 35 U.S.C. 154(b) by 352 days.

(21) Appl. No.: 10/434,847

(22) Filed: May 8, 2003

(65) Prior Publication Data

US 2003/0210779 A1 Nov. 13, 2003

Related U.S. Application Data (60) Provisional application No. 60/379,124, filed on May 8, 2002, provisional application No. 60/379,026, filed on May 8, 2002, provisional application No. 60/379,040, filed on May 8, 2002, provisional application No. 60/379,030, filed on May 8, 2002, provisional application No. 60/379,029, filed on May 8, 2002, provisional application No. 60/379,038, filed on May 8, 2002, provisional application No. 60/379,041, filed on May 8, 2002, provisional application No. 60/379,028, filed on May 8, 2002, provisional application No. 60/379,142, filed on May 8, 2002.

(51) Int. Cl.
*H04M 11/00* (2006.01)
(52) U.S. Cl. ............................. 379/93.09; 379/93.08; 379/93.28
(58) Field of Classification Search ............ 379/93.08, 379/93.01, 93.09, 93.35, 93.28, 93.31; 375/222
See application file for complete search history.

(56) References Cited

U.S. PATENT DOCUMENTS

| 4,757,495 | A | * | 7/1988 | Decker et al. | 370/477 |
| 4,995,074 | A | * | 2/1991 | Goldman et al. | 379/93.35 |
| 6,026,120 | A | | 2/2000 | Betts | 375/261 |
| 6,061,392 | A | | 5/2000 | Bremer et al. | 375/222 |
| 6,307,893 | B1 | | 10/2001 | Bremer et al. | 375/296 |
| 6,324,212 | B1 | * | 11/2001 | Jenness | 379/93.09 |
| 6,324,268 | B1 | * | 11/2001 | Balachandran et al. | 379/93.08 |
| 6,408,056 | B1 | | 6/2002 | Bremer et al. | 379/93 |
| 6,414,964 | B1 | | 7/2002 | Holmquist et al. | 370/449 |

(Continued)

OTHER PUBLICATIONS

ITU-T G.992.2; Splitterless Asymmetric Digital Subscriber Line (ADSL) transceivers; International Telecommunication Union; Jun. 1999; pp. 1-174.

(Continued)

*Primary Examiner*—Stella Woo
(74) *Attorney, Agent, or Firm*—Thomas, Kayden, Horstemeyer & Risley, LLP (57) ABSTRACT

The preferred embodiments of the present invention generally provide improved communications over a subscriber loop that is loaded with at least one and potentially a plurality of load coils. The preferred embodiments of the present invention will support digital subscriber line service over loaded subscriber loops that also support a native POTS interface and offer various techniques for advantageously arbitrating use of the 0-4 KHz baseband between POTS and DSL. Furthermore, the rapid start and stop DSL modulation techniques as well as various mechanisms such as protocol spoofing allow DSL service to appear to be always-on for many end user applications even though DSL communication may cease for POTS signaling messages and completed POTS telephone calls.

22 Claims, 3 Drawing Sheets

U.S. PATENT DOCUMENTS

| | | | |
|---|---|---|---|
| 6,522,730 B1 * | 2/2003 | Timm et al. | 379/93.08 |
| 6,546,090 B1 | 4/2003 | Bremer et al. | 379/93 |
| 6,580,785 B2 | 6/2003 | Bremer et al. | 379/88 |
| 6,658,096 B2 | 12/2003 | Bremer et al. | 379/93 |
| 6,715,124 B1 | 3/2004 | Betts | 714/792 |
| 6,829,292 B1 * | 12/2004 | Shenoi | 375/220 |
| 2002/0141569 A1 * | 10/2002 | Norrell et al. | 379/377 |
| 2003/0039348 A1 | 2/2003 | Bremer et al. | 379/220 |

OTHER PUBLICATIONS

ITU-T V.34; A modem operating at data signalling rates of up to 33,600 bit/s for use on the general switched telephone network and on leased point-to-point 2-wire telephone-type circuits; International Telecommunication Union; Feb. 1998; pp. i-iv, 1-72.

T1E1.4/2002-85; Performance of LE-ADSL on modified loaded loops longer the 18 kft; 2Wire, Inc.; Feb. 18-22, 2002; pp. 1-6.

T1E1.4/2002/86; LE-ADSL on modified loaded loops longer than 18kft; 2Wire, Inc., Feb. 18-22, 2002, pp. 1-3.

IEEE Communications Magazine, Dec. 1996; The V.34 High-Speed Modem Standard; G. David Forney, Jr., Less Brown, M. Vedat Eyuboglu, and John L. Moran, III; Dec. 1996; pp. 28-33.

ISBN 0070055920; The V Series Recommendations: Standards for Data Communications over the Telephone Network, Second Edition; Uyless Black; Copyright 1995; Chapter 5: The Voice-Band Modems Recommendation s—pp. 81-109.

* cited by examiner

AUTOMATIC RAPID SWITCHING BETWEEN DSL SERVICE AND POTS OVER LOADED LOOPS

CROSS-REFERENCE TO RELATED PATENT APPLICATIONS

This present application claims priority to several now abandoned U.S. provisional applications that were all filed on May 8, 2002 and also are each incorporated by reference in their entirety herein. The now abandoned U.S. provisional applications, which are incorporated by reference in their entirety herein, and to which priority is claimed, are listed by the following U.S. serial numbers and titles:

| | |
|---|---|
| 60/379,124 | "Loaded Loop DSL Service and Business Method" |
| 60/379,026 | "Loaded Loop DSL Modulation" |
| 60/379,040 | "Automatic Selection of Loaded Loop DSL or Standard DSL Service" |
| 60/379,030 | "Loaded Loop DSL Loop Intercession System" |
| 60/379,029 | "Automatic Switching Between Loaded Loop DSL and POTS" |
| 60/379,038 | "Multiple POTS Services on a Loaded Loop" |
| 60/379,041 | "Utilization of More Than One Loaded Loop for DSL Service" |
| 60/379,028 | "Data Communication Over Loaded Loops Simultaneous with POTS Call" |
| 60/379,142 | "Indirect Loaded Loop DSL" |

Furthermore, the present application is one of three related patent applications that are being filed on the same day. The three patent applications listed by attorney docket number and title are the following:

| | |
|---|---|
| 10/435,847 | "Digital Subscriber Line Service Over Loaded Loops" |
| 10/434,847 | "Automatic Rapid Switching Between DSL Service and POTS Over Loaded Loops" |
| 10/434,864 | "Indirect DSL Over Loaded and Unloaded Loops" |

Also, the patent application with Ser. No. 10/435,219, entitled "Digital Subscriber Line Service Over Loaded Loops", and filed on May 8, 2003, is incorporated by reference in its entirety herein. In addition, the patent application with Ser. No. 10/434,864, entitled "Indirect DSL Over Loaded and Unloaded Loops", and filed on May 8, 2003, is incorporated by reference in its entirety herein.

TECHNICAL FIELD

The present invention generally is related to telecommunications and, more particularly, is related to a system and method for improving the delivery of digital subscriber line (DSL) service.

BACKGROUND OF THE INVENTION

Digital Subscriber Line or Loop (DSL) communication technologies have been adopted by telephone service providers as a way of extending digital service to customer premises (CP) such as homes and offices. The advent of digital communication technology has resulted in an evolutionary change to communication systems as the facilities of switches and trunks in the networks of telecommunications service providers were converted first from analog to digital. Next, consumers wanted digital access to these digital capabilities in the network facilities of service providers.

However, delivering digital services over the local loop or subscriber line facilities to cover what is often colloquially called "the last mile" to the customer premises has been more of a challenge to provision. While various mechanisms have been used to deliver digital services to customer premises, making major changes to the wiring plant that feeds subscribers generally is still prohibitively costly. For customers located near a central office (CO) or close to a digital loop carrier (DLC) system, with the generally corresponding short cable wiring runs, DSL service is often available.

However, DSL capabilities still are not available to many customers located at farther reaches from central office switches and/or digital multiplexers such as a DLC. Furthermore, the historical telephone wiring plant feeding many customer locations was designed and optimized for the analog voice frequency communications of plain old telephone service (POTS) primarily found in the 0 to 4 KHz range. (One skilled in the art will be aware that the common bandwidth for unloaded POTS loops is primarily found in the 0 to around 4 KHz range, while the common bandwidth for loaded POTS loops is primarily found in the 0 to around 3.4 KHz range. One skilled in the art will be aware of these actual bandwidth differences of loaded and unloaded loops in carrying native POTS communication even though the POTS baseband is commonly referred to as a 0-4 KHz POTS baseband. One of ordinary skill in the art will be aware that such a reference is not completely accurate for loaded loops, but is a useful shorthand when discussing the POTS baseband configurations.)

Historically, telephone companies often found it advantageous to install inductors or load coils on many local loops to optimize performance of the loops in carrying POTS voice communication. Generally, the load coils or inductors were installed in series at various points along the telephone local loop. On a properly designed local loop, load coils generally are placed on subscriber loops that are greater than or equal to 18 Kft. in length. The load coils commonly used by the Regional Bell Operating Companies (RBOCs) have 88 milli-Henrys as the standard nominal inductance value for the coils. In general, load coils are spaced along a subscriber loop beginning at approximately 3 Kft. from a line card in a CO switch or DLC chassis with additional coils generally spaced along the loop approximately each 6 Kft. thereafter. The customer end portion of a local loop generally is allowed to have lengths ranging from 3 Kft. to 12 Kft. beyond the last load coil. In general, the local loop design rules used by the RBOCs specify that three or more load coils should be used on loops that are 18 Kft. or longer in length. In some special assembly situations, such as but not limited to analog POTS loops used as trunks for a customer's PBX, the RBOCs may use load coils on loops as short as 15 Kft. in length with a minimum of two load coils.

Essentially, adding an inductor in series results in the creation of a low-pass filter. While the low-pass filtering of these load coils improves performance in the 0 to around 3 KHz base bandwidth of an analog POTS interface, the filtering results in detrimental effects (primarily attenuation) on the higher frequency signals above 3 KHz that generally are used in DSL technologies. Unfortunately, the problem is not solved simply by getting the service provider to remove the load coils on each loop. While such an action certainly solves the technical limitations of load coils on DSL performance, economically it is an expensive process to remove the load coils. Furthermore, removal of the loading coils re-introduces the voice-band degradations that the coils were introduced to overcome. As a result, the service provider often cannot justify the costs of basically custom re-engineering each of the multitude of subscriber lines to remove load coils in order to earn the additional revenues from offering DSL service. Removing load coils generally would involve identifying the location of all of the load coils on a subscriber loop and sending a technician to each location to take the load coil out of the subscriber line circuit. Just sending the technician to each location would be costly enough. However, the physical process of removing load coils can create additional problems. For instance, most cables in the underground are pulp insulated such that wire pairs can be easily damaged as a result of a technician or cable splicer working on the splice to locate the wire pair affected by load coils. Obviously, damage to other pairs may knock out phone service to existing customers.

In addition, often the databases and records of service providers are incomplete and/or inaccurate in keeping up with the location of all the load coils that were installed on a particular subscriber loop over the years. Thus, in some cases various transmission line tests (such as, but not limited to tests performed by a time-domain reflectometer or TDR) might have to be performed to determine the distance along a subscriber loop transmission line at which there are changes in the characteristic impedance of the transmission line indicating potential items such as, but not limited to, load coils, junction splices, bridge taps, and/or connection points.

Because an impedance mismatch in a transmission line causes at least part of the energy from propagating electromagnetic signals to be reflected or echoed back in the opposite direction of the original propagation, a TDR and other types of test equipment generally can be used to send signals down a transmission line and measure the amount of time before a signal reflection or echo is received at the test equipment. This time measurement together with the estimated speed of propagation of the electromagnetic wave in the transmission line medium can be used to provide an estimate of the distance along the transmission line (such as a subscriber loop) where impedance mismatches occur. In general, telephone companies (or telcos) maintain computerized or paper plat records showing the location of telco facilities such as, but not limited to, wires, splice points, cross-connects, and DLCs used in delivering service to residential and commercial areas. The transmission line distances provided by a TDR or other test equipment for the potential location of impedance mismatches, which might be caused by load coils, would have to be used to estimate the approximate geographic location of a load coil based on the potentially inaccurate service provider records showing the wiring path for the transmission line from the central office or DLC to the customer premises. Obviously, such activities of identifying load coils and possibly having a technician physically track down the path followed by a subscriber loop transmission line can b e costly. As a result of these load coil issues, either some customers are not offered DSL service at all or the price of the service is higher than it should be because of the increased costs of removing load coils. Thus, service providers are not able to offer DSL service to a relatively larger number of potential subscribers because of the load coil issue. Improving this load coil problem would increase the number of customers and associated revenues available to the service provider.

In addition, subscriber loops normally run through various other facilities in connecting a customer premises to a line card in a central office switch or in a digital multiplexer such as a DLC. Often telephone wiring is run in groups of large multi-pair cables from a connection co-located with the line cards to a splice point, junction terminal, or cross-connect point. The cross-connect point generally is an unpowered box where technicians can cross-connect the wires leading to a customer premises with the appropriate wires leading back to the line cards in a switch or DLC. Often the portion of a local loop transmission line from a cross-connect box back to a line card is known as the F1 or feeder portion of a local loop, while the portion of a local loop transmission line from the cross-connect to the customer premises is known as the F2 or distribution portion of a local loop. Normally, the cross-connect box uses various mechanical technologies (such as but not limited to various punch-down block technologies) that are common in telephone wiring to simplify a technician's work in connecting the two portions of a subscriber loop. Unlike a digital loop carrier (DLC) cabinet, which generally is provided with power from the central office (and/or other sources) to enable the operation of the electronic devices of the line cards and multiplexing equipment, cross-connect boxes and/or cabinets generally are not provided with power other than the powering delivered over the POTS interface of each in-service POTS loop that provides for basic POTS functionality powering to a customer premises. This power on a POTS loop is designed for powering POTS analog phones with basic functionality (such as, but not limited to, dial tone) at the customer premises and generally does not provide a significant amount of excess power that could be siphoned off to power other types of electronic digital communications equipment. Often analog phones with POTS interfaces that offer more functionality such as a speaker phone or memory need additional power from an AC outlet or battery at the customer premises because the POTS interface does not provide enough power to meet the needs of these additional electronic functions.

In providing DSL service, often the network-side or CO-side of the DSL line is terminated in a DSLAM (Digital Subscriber Line Access Multiplexer) that usually is capable of supporting multiple DSL loops. One skilled in the art will be aware that a DSLAM normally comprises a plurality of DSL modems and some statistical multiplexing concentration equipment. However, such DSLAM equipment normally needs a reasonable amount of power and is usually placed in locations where power is readily available such as a central office (CO) or DLC cabinet. As cross-connect boxes generally do not have power available for powering active electronics, DSLAMs are not placed in cross-connect boxes. Furthermore, cross-connect boxes generally are not large enough to encompass significant amounts of additional electronic equipment in contrast to the relatively larger cabinets containing DLCs. Thus, normal deployment of DSLAMs for providing DSL service to customers does not place DSLAMs in cross-connect boxes at least because cross-connect boxes generally do not have a ready source of sufficient power and cross-connect boxes generally are not large enough for holding the DSLAM equipment.

Given these and other limitations of the wiring cable plant that was often originally installed many years ago to just provide basic POTS, new innovations that increase the availability and lower the total costs of delivering digital subscriber line (DSL) service provide benefits that can allow more consumers to obtain a reasonable digital service access line at an affordable price point.

SUMMARY OF THE INVENTION

The preferred embodiments of the present invention provide an apparatus and/or method for increasing the availability of DSL service by allowing service to be offered to more subscribers without having to expend the costs to remove all the limitations from subscriber line transmission lines. Briefly described, in architecture, one embodiment of the apparatus, among others, can be implemented as logic to sense whether a POTS signal needs to be communicated over a subscriber loop and logic to control digital subscriber line usage of the subscriber loops based at least on the sensing. In addition, one embodiment of the method can be implemented using the steps of sensing whether a POTS signal needs to be communicated and of controlling digital subscriber line usage of a subscriber loop based at least upon the sensing.

The POTS signal may be a POTS signaling message or a POTS telephone call. In addition, DSL service may be either halted completely to communicate the POTS signal or may be stopped only in the frequency range commonly used for POTS communication. Furthermore, various techniques can be used to provide end users and/or applications with the appearance that DSL service is always-on.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Various types of modulation and/or duplexing techniques can be used to overcome the limitations of load coils. By their nature, the low-pass, frequency-dependent filtering of load coils creates serious adverse effects on duplexing strategies that depend at least in part on frequency as well as on multiplexing strategies that depend on frequency separation to utilize a subscriber loop both for a basic native POTS interface in the 0-4 KHz POTS baseband together with the associated POTS signaling (such as but not limited to, POTS ringing, call waiting, calling line ID, and/or dual-tone multi-frequency (DTMF) or pulse/rotary dialing) and for DSL service. One skilled in the art will be aware of the differences between a native POTS interface on a subscriber access line or loop and a derived or synthesized voice call functionality that may be provided through a local POTS interface off of customer premises equipment (CPE) that connects to one or more digital channels or digital media on a digital subscriber access line or loop. One non-limiting example of such a derived or synthesized voice call functionality is the circuit-switched speech capability available from an analog POTS port on an ISDN BRI terminal adapter (TA) that utilizes a 64 kbps ISDN B-channel to carry digital pulse code modulation (PCM) samples over the digital subscriber access loop or line back to the line card. Other more current synthesized or derived digital voice technologies often utilize compressed and/or packetized encoding of human voice instead of the 64 kbps or 56 kbps DS0s. Many but not all customers prefer DSL service to be offered on the same access line/loop (or lines/loops) that supports a basic native POTS interface in the 0-4 KHz baseband because many customers often view basic POTS service as a lifeline of the bare minimum quality of connectivity that is expected to be available in all but the most catastrophic emergency conditions such as an earthquake or hurricane. Thus, a solution that provides faster digital service over a loaded subscriber loop together with a capability to support an analog POTS interface is important.

Figure 1:
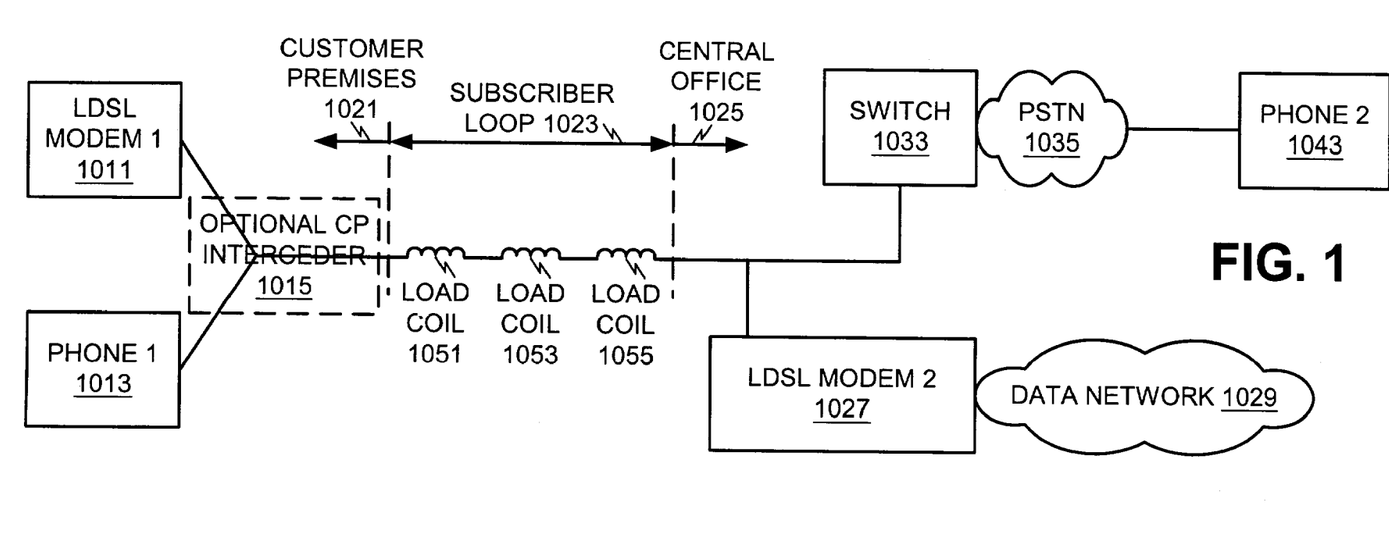
FIG. 1 is a block diagram showing that loaded loop DSL communication is possible over a loaded subscriber loop using various modulation and/or duplexing technologies.

FIG. 1 generally is the same as FIG. 5 of the patent application Ser. No. 10/435,219, entitled "Digital Subscriber Line Service Over Loaded Loops", and filed the same day that was incorporated by reference in its entirety herein. For completeness, some of the material describing FIG. 5 in the patent application Ser. No. 10/435,219, entitled "Digital Subscriber Line Service Over Loaded Loops", and filed the same day is repeated herein, with appropriate changes to reference numbers. As suggested previously, one technical solution to the communications problems load coils is to redesign, reengineer, and/or redeploy a subscriber loop by removing the load coils, which eliminates the problems. However, for economic and business reasons such a solution may not be an efficient use of resources. A technical solution that allows some level of DSL communication performance greater than that provided for by V.34 modems without having to expend the economically costly resources in removing the load coils from a loop or deploying a new unloaded loop to a customer premises is preferable.

The preferred embodiments of the present invention offer some possible solutions to this economic/technical problem of loaded subscriber loops. In general, using different modulation and/or duplexing techniques than usual DSL deployments allows service providers to offer a DSL-quality service that outperforms V.34 modems on loaded loops. Unlike the frequency-dependent nature of frequency-division duplexing, which is adversely affected by frequency-dependent filtering such as the low-pass filtering from load coils, time division duplexing (TDD) generally shares a communications medium or a channel in a communications medium by allowing one direction of communication to utilize the medium or channel for a part of the time with the other direction of communication generally utilizing the medium or channel for the other part of the time to support the two directions of bidirectional communications. One skilled in the art will be aware of the basic concepts of TDD. Furthermore, time division duplex does not have to necessarily allocate fixed or static amounts of time to each direction of communication. Also, even with fixed or static allocations of time, the allocations do not have to have a 50% -50% even allocation to each direction of communication. Normally, the technique of dynamically or adaptively varying the time allocation for each direction of communication in time-division duplexing is known as adaptive time-division duplexing (ATDD).

Generally, TDD and/or ATDD involve a first device transmitting (without receiving) during a first time interval while the second device is only receiving and not transmitting during that first time interval. Then, during a second time interval that is essentially non-overlapping with the first time interval, the second device generally transmits without receiving while the first device generally receives without transmitting. In addition, although TDD/ATDD generally is viewed with respect to duplexing support for bi-directional communications between two devices with a point-to-point relationship, TDD/ATDD also can be used in multi-point configurations with three or more devices. A further description of TDD and/or ATDD may be found in U.S. patent application Ser. No. 10/420,204, entitled "Extended-Performance Echo-Cancelled Duplex (EP ECD) Communication", and filed on Apr. 22, 2003, which is incorporated by reference in its entirety herein.

In addition to describing TDD and ATDD, the "Extended-Performance Echo-Cancelled Duplex (EP ECD) Communication" patent application with U.S. Ser. No. 10/420,204 describes another duplexing technique that may be called extended-performance echo-cancelled duplex (EP ECD). Like TDD and ATDD, EP ECD generally utilizes at least two modes of essentially non-overlapping intervals of time. Also like TDD/ATDD, in EP ECD signal levels generally are adjusted in switching between and/or among the modes of EP ECD. However, each time-interval mode of EP ECD does allow some concurrent transmission and reception by EP ECD devices through the use of echo cancellation technology. One skilled in the art will be aware that echo cancellation generally operates by a receiver in a first device summing up delayed and attenuated versions of the transmit signal from the first device to obtain an estimate of the echo at the receiver in the first device. This estimate of the received echo is then subtracted from the signal received at the first device to better estimate the originally transmitted signal from a second device that is in communication with the first device. Using different signal levels during essentially different non-overlapping intervals of time together with echo cancellation allows improved performance of EP ECD over both pure TDD/ATDD and pure echo cancelled duplex (ECD) for some types of channel characteristics. The adjustment of signal levels in EP ECD adjusts not only the signal levels of transmitted and received information, but also the signal level of received echo. Because echo cancellation technology does not perfectly estimate the echo received, some residual echo noise still exists in incoming signals that is the result of the echoes together with the imperfect echo cancellation. Thus, the adjustment of signal level in switching between and/or among modes of EP ECD adjusts the transmit and receive information signal levels as well as the residual echo noise signal level. In EP ECD, adjusting the signal level as well as adjusting the noise level changes the signal to noise ratio, which generally is related to channel capacity by the channel information encoding capacity theories that are primarily attributable to Claude Shannon of which one skilled in the art will be aware.

Furthermore, standard operating practice for some time at telephone companies has been to initially wire most residences with two local loops or two pairs of wires for a total of four wires. One skilled in the art will be aware that four-wire duplexing is another duplexing technique that can be used when enough conductors are available. Four-wire duplexing may involve using different conductors for different directions of signal propagation. On a balanced interface with four-wire duplexing, one pair of wires commonly is used for transmitting, while another pair of wires commonly is used for receiving, with the two pairs being a total of four wires. On an unbalanced interface, such as but not limited to RS-232, three wires may be used with one for transmit, one for receive, and a common signal ground. Thus, by carrying the signals for different directions of propagation on different conductors or media, RS-232 is a form of "four-wire duplexing" that actually uses just three wires in an unbalanced interface. Using four-wire duplexing instead of frequency-division duplexing to support digital subscriber line service would provide better performance behavior on loops with load coils. Furthermore, if additional loops are available, these loops also may be multiplexed together in offering digital service over three or more pairs of wires. As used herein, four-wire duplexing will include using at least three wires (and preferably at least two pair or at least four wires) to a customer premises. Duplexing techniques such as TDD/ATDD, EP ECD, and four-wire duplexing can be used with modulation techniques such as, but not limited to, pulse amplitude modulation (PAM), Discrete Multi-Tone (DMT) modulation, and carrierless amplitude-phase (CAP) modulation as well as quadrature amplitude modulation (QAM).

As a particular example of the performance limitations of loops with load coils or loaded loops, attenuation on a 18 Kft AWG (American Wiring Gauge) 24 loaded loop starts to rapidly increase above 3300 Hz and reaches 50 dB of attenuation at around 6 KHz. In contrast, on a 18 Kft AWG 24 unloaded loop, attenuation generally does not reach 50 dB until about 100 KHz. Thus, the 50 dB loss point bandwidth on a loaded loop is about 6 KHz/100 KHz=0.06 that of an unloaded loop. Utilizing this loaded loop bandwidth between 4 KHz and 6 KHz generally is impractical for communications technologies such as V.34 that primarily utilize echo cancellation for duplexing. Such echo cancellation generally has a practical noise floor for eliminating echo noise of around 60 dB or less. Since the received signal level at 6 KHz has been attenuated 50 dB and since the echo canceller noise floor is 60 dB below the transmit level, the resultant signal-to-noise ratio at 6 KHz is 10 dB, which is a value so low as to prohibit effective communication. Thus, load coils make it impractical to use the common frequency-division duplexing techniques of ADSL as well as the pure echo-cancellation techniques of V.34 to maximize communications performance over the loaded subscriber loop. To obtain performance better than the 28.8 kbps or 33.6 kbps of V.34 over loaded subscriber loops, a new configuration is needed.

FIG. 1 shows a potential solution to the problems of DSL communication over loaded loops. In FIG. 1, a first loaded loop DSL (LDSL) modem 1011 and a first analog POTS phone 1013 are connected to an optional customer premises (CP) interceder 1015 that generally is located at customer premises 1021. Because the CP interceder 1015 is optional, the first loaded loop DSL (LDSL) modem 1011 and the first analog POTS phone 1013 may just be bridged together onto the subscriber loop 1023, which provides further connectivity to a central office 1025 (or a DLC). A CP interceder 1015, which is optional in FIG. 1, generally is placed in series with a subscriber loop 1023 and is connected between POTS equipment such as the first analog POTS phone 1013 and DSL equipment such as the first LDSL modem 1011. A CP interceder 1015 generally functions to disconnect and isolate the POTS equipment from the subscriber line when the POTS equipment is not in use and generally functions to disconnect and isolate the DSL equipment from the subscriber line when the DSL equipment is not in use. When POTS is not being used across subscriber loop 1023, an optional CP interceder 1015 can be used to increase DSL data rates by reducing the non linear distortion effects of on-hook POTS equipment, such as but not limited to first analog POTS phone 1013. Unlike other DSL solutions, the preferred embodiments of the present invention may utilize the same 0-4 KHz frequency baseband as POTS without requiring a CP interceder 1015. A CP interceder 1015 may provide some additional performance benefits in isolating the subscriber loop 1023 from some analog POTS equipment such as the first analog POTS phone 1013 to reduce various distortions caused by the analog POTS equipment during the time that DSL communications are using the 0-4 KHz POTS baseband. Also, a CP interceder 1015 may provide some additional performance benefits in isolating the subscriber loop 1023 from some DSL equipment such as the LDSL modem 1011 to reduce various distortions caused by the DSL equipment during the time that analog POTS communications are using the 0-4 KHz POTS baseband. However, a CP interceder 1015 is optional, and the preferred embodiments of the present invention will work without the presence of such an optional CP interceder 1015. More details about the functionality of interceders can be found in U.S. Pat. No. 6,408,056 to Gordon Bremer and Thomas Bingel, entitled "Local Loop Interceder", filed on Feb. 26, 1998, and issued on Jun. 18, 2002, which is incorporated by reference in its entirety herein.

The use of various duplexing techniques such as but not limited to TDD/ATDD and 4-wire (or at least three wire) duplexing allows fast training that makes it practical for the first LDSL modem 1011 to quickly switch between using the 0-4 KHz baseband to support POTS service and using a frequency range such as, but not limited to, 0-6 KHz, which overlaps the POTS baseband and generally goes above the POTS baseband associated with the corresponding general passband of the load coils, to support DSL service. Normally, echo-cancellation generally requires more delay in training such that pure echo-cancelled duplex is not a good solution for DSL service over loaded loops. Furthermore, the training for echo cancellation used in EP ECD may not need to be as long as the echo cancellation used in pure echo cancelled duplex because, like TDD/ATDD, EP ECD also varies signal levels during essentially non-overlapping intervals of time. Thus, in addition to TDD/ATDD and four-wire duplexing, EP ECD may be another reasonable candidate for a duplexing strategy that can rapidly adapt to changes in the state of POTS usage of the subscriber line. Although EP ECD uses echo cancellation as at least part of the duplexing technique, because the duplexing technique in EP ECD is not solely based on echo cancellation, the echo cancellation in EP ECD may not have to be as accurate as the echo cancellation of pure echo cancelled duplex. Less accurate echo cancellation generally may be able to operate with shorter training times than echo cancellation that has to be more accurate because echo cancellation generally is the only technology used for duplexing in pure echo cancelled duplex.

Thus, using duplexing techniques of TDD/ATDD, four wire duplexing, and/or EP ECD, the first LDSL modem 1011 can communicate over a loaded subscriber loop 1023 to a second LDSL modem 1027 that provides connectivity to data network 1029, which commonly is a packet-switched network but is not necessarily limited to packet switching. In a non-limiting example, the communications between first LDSL modem 1011 and second LDSL modem 1027 may utilize the 0-6 KHz range on a loaded subscriber loop 1023 that is arbitrarily shown with three load coils 1051, 1053, and 1055. In addition to supporting DSL service over a loaded loop, the preferred embodiments of the present invention also allow for analog POTS service between the first analog POTS phone 1013 and the second analog POTS phone 1043 over loaded subscriber loop 1023 and through switch 1033 and PSTN 1035. One skilled in the art will be aware that other types of access lines such as, but not limited to, an ISDN BRI can also terminate and initiate circuit-switched voice or speech calls in addition to second analog POTS phone 1043. Also, as stated previously, one skilled in the art will be aware that data network 1029 and PSTN 1035 may be implemented using other technologies than the common historical implementations of packet switching and circuit switching respectively.

By using a duplexing technique such as TDD/ATDD, four-wire duplexing, and/or EP ECD, the configuration of FIG. 1 can effectively utilize the bandwidth within the POTS baseband and at frequencies above the POTS baseband on a loaded subscriber loop 1023 plus those various duplexing technologies can quickly and rapidly startup and stop to allow the loaded subscriber loop 1023 also to be used for analog POTS phone calls and POTS signaling messages. In FIG. 1, the deployment of LDSL modems 1011 and 1027 at the customer premises 1021 and central office 1025 (or DLC) allows potentially higher performance over a loaded subscriber loop 1023 than would be available through V.34 modems that are designed for communicating data through the PSTN 1035. Also, the communications between LDSL modems 1011 and 1027 might well be faster than the V.90 modem communications that generally are limited to a maximum DS0 speed of 56 kbps that is carried through the PSTN 1035. As shown in FIG. 1, the second LDSL modem 1027 is connected in parallel with the CO switch 1033 such that DSL communications need not go through the PSTN 1035, which currently limits calls to 64 kbps DS0s. Thus, the configuration of FIG. 1 allows potentially better data communications service than is currently available through V.34 and V.90 modems, and also is capable of operating over a loaded subscriber loop 1023 with at least one load coil and even operating with a plurality of load coils such as, but not limited to, load coils 1051, 1053, and 1055.

Thus, the preferred embodiments of the present invention allow for communications over loaded loops at data rates above the 28.8 kbps and/or 33.6 kbps of V.34 and may also allow performance exceeding a DS0 rate of 56 kbps and/or 64 kbps. To achieve this performance the bandwidth above 4 KHz POTS baseband is capable of being utilized between LDSL modems 1011 and 1027 with the preferred embodiments utilizing the frequency bandwidth from approximately 0-6 KHz and higher. However, the embodiments of the present invention do not require that the bandwidth above 4 KHz is utilized.

Also, one skilled in the art will be aware that various standards and regulatory bodies have developed electromagnetic emissions standards to reduce and mitigate the interference from one electromagnetic phenomena on another electromagnetic phenomena. With particular respect to local loop telephone wiring, the North American Spectrum Management Standards provide limitations to reduce the effect that electromagnetic waves on one wire pair induce onto another wire pair in the same multi-pair cable. For V.34, the typical power spectral density (PSD) is about −45 dBm/Hz at a bandwidth of 3200 Hz, while the common DSL standards allow 16 dB higher than V.34 for −29 dB/Hz in both directions. The PSD for the LDSL modems 1011 and 1027 in FIG. 1 may be adjusted based on the number of load coils, subscriber loop length, and/or wiring gauge. Also, the PSD for LDSL modems 1011 and 1027 may be set to higher levels than the current V.34 technology that operates over load subscriber loops, while still staying within the PSD requirements for other modulation schemes that are used in other DSL technologies, which are compliant with the North American Spectrum Management Standards. However, the preferred embodiments of the present invention do not require that the PSD for LDSL modems 1011 and 1027 be higher than the V.34 PSD. In addition, the preferred embodiments of the present invention are capable of using relatively large bits/Hz signaling densities with relatively low bit error rates based on the signal-to-noise ratios available from using TDD/ATDD, four-wire duplexing, and/or EP ECD. Also, various techniques of TDD and/or ATDD as utilized in Paradyne's MVL and ReachDSL products can be applied to LDSL modems 1011 and 1027 to allow seamless rate adaptation, power level adaptation, rapid sensing of various channel parameter changes and resulting transceiver adaptations.

Furthermore, the rapid startup and stop times of the duplexing and modulation strategies of the preferred embodiments of the present invention, allow the same loaded subscriber loop 1023 to support DSL service and POTS service. The quick start and stop times of the duplexing and modulation techniques in the preferred embodiments of the present invention allow the DSL service to be temporarily interrupted for short periods to communicate various types of POTS signaling such as ringing voltage, customer premises POTS phone off-hook signals, central office MLT (mechanized loop testing), and/or CO-based CLASS (Custom Local Area Signaling Services) service events such as, but not limited to, call waiting and calling name and/or number identification (calling line ID or CLID). In some instances the startup training times can be as low as 15 milliseconds. Thus, the DSL communication can be stopped for a short interval to allow POTS signaling, and then the DSL communication can be resumed in as short as 15 msecs. after the end of the POTS signaling. In many cases, such small stoppages of data communication will be transparent to end user applications.

Also, end user policy decisions can be statically configured in the equipment to specify preferences when POTS phone calls should interrupt DSL communications for longer durations. Also, such decisions could be dynamically made by the end user based on the importance of particular phone calls. As a non-limiting example, an end user might be using the local loop 1023 for DSL communication to download a file. If the switch 1033 has an incoming circuit switched voice call for the end user's telephone number, the DSL communication may be temporarily stopped while the switch 1033 provides POTS ringing signals and calling line ID signals. Based on the CLID of the incoming call, the end user can decide whether to answer the call and potentially halt the DSL communications for a more significant amount of time or allow the call to be forwarded by the PSTN 1035 on a busy/no-answer condition to a voice mail system. Also, another non-limiting example of a policy decision may be to never allow incoming POTS calls to interrupt DSL communications while always allowing outgoing POTS calls to interrupt DSL communications. One skilled in the art will be aware of other common priority preferences that users may develop to decide policies as to when a voice call should interrupt DSL communications for a more significant amount of time. In general, CPE can be developed to implement various potential user policies on situations where analog POTS service should take priority over DSL service for use of the subscriber loop 1023, and the CPE also can be developed to allow users to define their own policy preferences.

The support for a native POTS interface on the same subscriber access loop that provides DSL service is more of a problem for subscriber loops with load coils due to the limited frequency bandwidth of a subscriber loop that has load coils acting as low-pass filters. However, the preferred embodiments of the present invention utilize duplexing and/or modulation techniques that are less sensitive to the frequency-dependent filtering of load coils and have short startup and stop times. Thus, the modulation techniques such as, but not limited to, pulse amplitude modulation (PAM), Discrete Multi-Tone (DMT) modulation, and carrierless amplitude-phase (CAP) modulation as well as quadrature amplitude modulation (QAM) together with the duplexing techniques of TDD/ATDD, four-wire duplexing, and EP ECD allow for a different paradigm for providing both DSL and POTS capability over the same subscriber loop that is affected by the low-pass filtering of load coils.

In general, the new paradigm for providing POTS and DSL service over a single subscriber loop involves using time-division multiplexing (TDM) to share at least part of the limited frequency spectrum (in the 0-4 KHz range) of a loaded subscriber loop to support a basic POTS interface and a DSL service. The quick start and stop times for the various modulation techniques allows DSL data communication to be halted during the relatively short durations when POTS signaling information needs to be passed over the POTS interface of the subscriber access line. After a POTS signaling message is completed, the DSL communication can be restarted in a short period before more POTS signaling information needs to be communicated. Ultimately, use of the 0-4 KHz POTS baseband for a long duration telephone call may halt or significantly diminish the performance of digital data DSL communication. However, such a decision to halt DSL data communications can be left to policy decisions made on the spur of the moment by the end user or by pre-configured policy decisions by at least some of the customer premises equipment (CPE).

Figure 2:
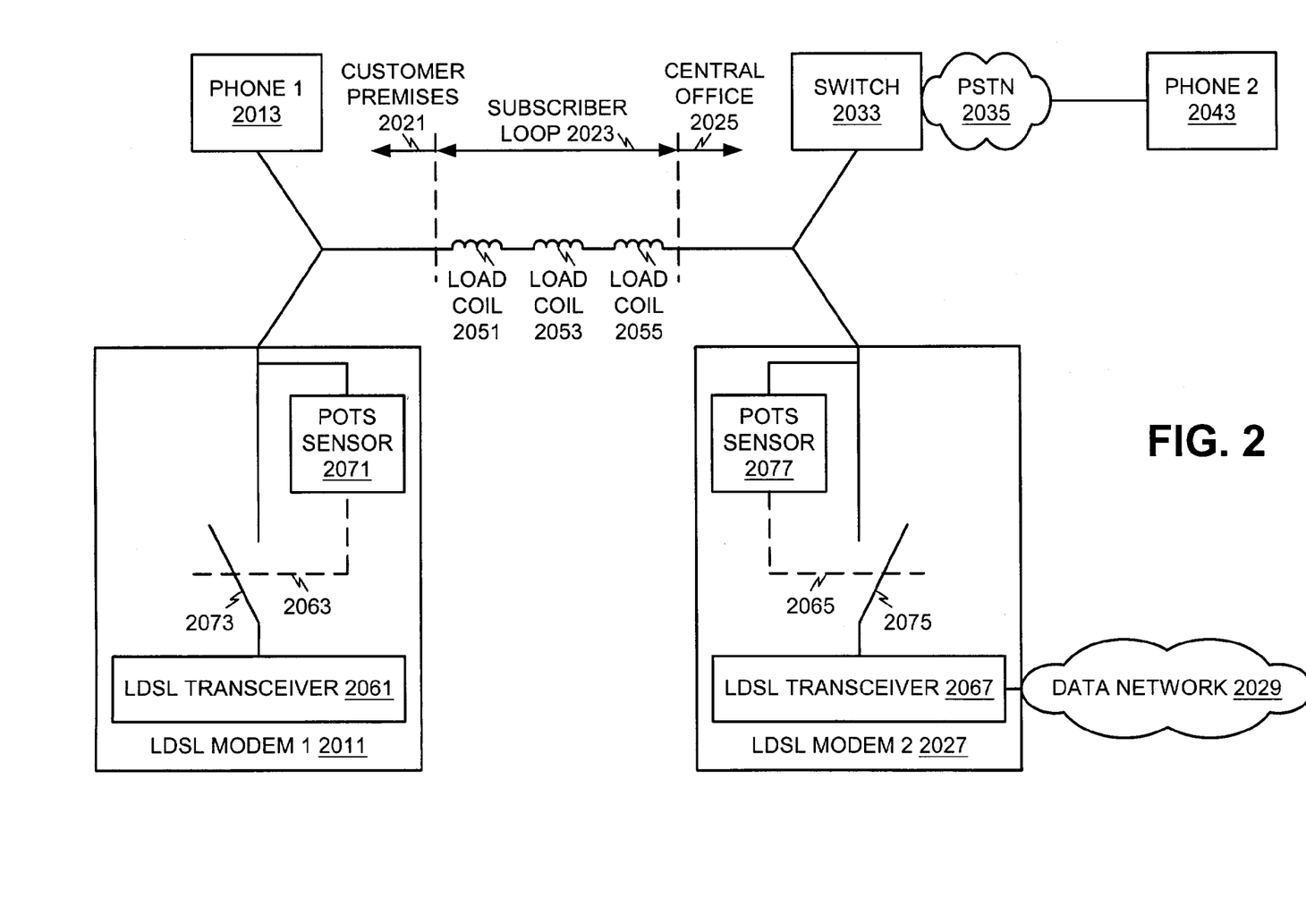
FIG. 2 is a block diagram showing POTS sensors in a configuration where DSL communication generally halts when the 0-4 KHz baseband is being used for POTS signaling and/or POTS telephone calls.

To implement this type of DSL service that also allows a POTS interface to utilize the same subscriber access line, some form of POTS line status sensor may be utilized. FIG. 2 shows such a configuration. In FIG. 2, a first loaded loop digital subscriber line (LDSL) modem 2011 and a first analog POTS phone 2013 are connected to a subscriber loop 2023 between a customer premises 2021 and a central office 2025. (One skilled in the art will be aware that the line card for a POTS interface may be located in a digital loop carrier multiplexer instead of a central office switch.) The network-side or CO-side of the loaded subscriber loop 2023 is connected to a second LDSL modem 2027, which is further connected to data network 2029. In the preferred embodiments, data network 2029 usually is a packet switching network utilizing statistical multiplexing. However, the embodiments of the present invention are not to be limited to just connection to packet switching data networks.

In addition, the subscriber loop 2023 is connected to switch 2033, and one skilled in the art will be aware that a subscriber loop 2023 may be terminated in a digital loop carrier (DLC) instead of a switch. The switch is connected to PSTN 2035, which further is connected to other local loops including a POTS loop to the second analog POTS phone 2043. The subscriber loop 2023 in FIG. 2 is a loaded subscriber loop and contains at least one load coil arbitrarily shown as load coils 2051, 2053, and 2055. The first analog POTS phone 2013 and the second analog POTS phone 2043 can communicate through the PSTN 2035 using the ordinary and everyday processes for making PSTN telephone calls. Also, one skilled in the art will realize that the circuit-switched voice call to or from the first analog POTS phone 2013 may be initiated or terminated with another phone connected over other types of access loops than a POTS subscriber loop.

FIG. 2 shows a further breakdown of the functionality of the first LDSL modem 2011 and the second LDSL modem 2027. In FIG. 2, the first LDSL modem 2011 comprises LDSL transceiver 2061 and POTS sensor 2071, while the second LDSL modem 2027 comprises LDSL transceiver 2067 and POTS sensor 2077. POTS sensors 2071 and 2077 are connected to subscriber loop 2023 and basically act to connect and disconnect LDSL transceivers 2061 and 2067 from the subscriber loop 2023, via switches 2073 and 2075, based on the condition of the subscriber loop 2023 in passing analog POTS communications and/or POTS signaling messages such as, but not limited to, POTS ringing, POTS off-hook, POTS calling line ID (including name and/or number), other CLASS (Custom Local Area Signaling Services) features (such as, but not limited to, distinctive ring and/or message waiting), as well as central office MLT (mechanized loop testing). One skilled in the art will be aware that the CLASS services for POTS often involve specialized signaling messages that are defined in various industry standards such as those produced by Telcordia (formerly Bell Communications Research or Bellcore). In particular, Telcordia reference Generic Requirements (GR30-CORE) defines open switching intervals (OSIs) for POTS signaling that effectively open the local loop (e.g., remove the presence of direct current) for intervals of 100 s of milliseconds to indicate that an on-hook transmission path is needed by the line card in a switch or DLC chassis. Such on-hook transmission paths by the line card are used for communicating various CLASS functions such as, but not limited to, a message waiting indication from a voice mail system. The preferred embodiments of the present invention generally would monitor for these open switching intervals and cease DSL data communication upon detecting an open switching interval to allow on-hook CLASS signaling messages to pass over the subscriber loop 2023.

By temporarily halting DSL service at least in the POTS baseband frequency of 0-4 KHz (and potentially completely) on loaded loops just during the short duration of these POTS signaling messages, the fast startup times of the LDSL modems 2011 and 2027 can offer a digital service to end users that appears to be "always-on". In general, a DSL modulation with a startup time of less than about one second and a stop or rapid shut off time in the order of tens of milliseconds would be capable of acting fast enough to stop and start for passing various POTS signaling messages without significantly affecting data communications. Of course end user or CPE policy decisions to actually utilize the 0-4 KHz POTS baseband for a POTS telephone call would likely degrade or halt data communications to an extent that is noticeable. However, either the end user would be directly making such a decision to prioritize the use of the 0-4 KHz POTS baseband for an active POTS call over DSL data communication or the end user would be making the prioritization decision based on the configuration of the CPE. Still, the use of a modulation scheme on loaded loops that allows fast on and off switching of the modulation (or fast starting and stopping of the modulation) together with POTS sensors 2071 and 2077 that can recognize POTS signaling allows a customer the advantages of DSL service over loaded loops without sacrificing the ability to make a priority decision to use the bandwidth for POTS if the situation so warrants. Allowing various CLASS signaling messages to be passed during short time periods in between utilization of the subscriber loop 2023 for DSL data communications, allows an end user or CPE to make more intelligent decisions about when a POTS phone call should take priority over the DSL data communication. For example, based on calling line ID information that is passed as POTS CLASS signaling, an end user may decide to halt or significantly reduce DSL data communications to answer an incoming call from a phone number associated with a family member. However, an incoming phone call with an unknown calling line ID, which might be associated with a telemarketer, may not cause the end user to halt or diminish DSL data communications by answering the incoming POTS call.

As shown in FIG. 2, POTS sensor 2071 has some control mechanism 2063 that controls switching of LDSL transceiver 2061 onto or off of subscriber loop 2023 through switch 2073. Also, POTS sensor 2077 has some control mechanism 2065 that controls switching of LDSL transceiver 2067 onto or off of subscriber loop 2023 through switch 2075. It should be understood that POTS sensors 2071 and 2077, switches 2073 and 2075, and/or control mechanisms 2063 and 2065 may or may not be integrated into LDSL modems 2011 and 2027 respectively. Also, one skilled in the art will be aware that the first analog POTS phone 2013 may actually be a plurality of POTS devices including phones, dial modems, answering machines, fax machines, etc. Generally, when any of the POTS devices on the line are using the subscriber loop 2023 for a POTS call (or when a POTS signaling message is passed over the line), the POTS sensors 2071 and 2077 will disconnect the LDSL transceivers 2061 and 2067 respectively from the subscriber loop 2023 to present high impedance to the subscriber loop 2023. When the subscriber loop 2023 is not used for a POTS call or POTS signaling, the LDSL transceivers 2061 and 2067 are switched through switches 2073 and 2075 respectively to connect to subscriber loop 2023.

The POTS sensors 2071 and 2077 basically can continuously or frequently sense the state of POTS service to determine if POTS CPE such as the first analog POTS phone 2013 is off-hook. Also, the POTS sensors 2071 and 2077 can frequently or continuously sense whether POTS CPE has gone back on hook (including the ability to disregard false POTS signaling such as, but not limited to, pulse dialing after a POTS call is a ready connected). Upon termination of a POTS phone call, the POTS sensors 2071 and 2077 close switches 2073 and 2075 to connect the LDSL transceivers 2061 and 2067 respectively to the subscriber loop 2023. The termination of the subscriber loop 2023 with LDSL transceivers 2061 and 2067 generally is not enough for POTS equipment or the POTS line card in switch 2033 or a DLC to sense an off-hook POTS condition, which generally would cause a line card to provide dial tone in the 0-4 KHz POTS baseband. As an example, in a preferred embodiment the LDSL transceivers 2061 and 2067 may present a DC resistance of at least five megaohms.

Furthermore, FIG. 2 primarily has been described with respect to the currently deployed POTS standards and technologies. However, new and more intelligent POTS devices could be developed that also are capable of sensing the state of the subscriber loop 2023 and whether the 0-4 KHz baseband is currently being used for DSL data communications. (Although new and more intelligent CPE devices may offer additional functionality, often such functionality is implemented using a processor and/or other logic hardware that requires powering. Therefore, adding more functionality to a POTS CPE device may well work against the purpose of providing basic POTS service on the same local loop as DSL capabilities to handle lifeline situations of catastrophic emergencies, when the local power source at a customer premises fails. A sophisticated design for intelligent POTS CPE might be able to revert to basic POTS functionality without all the intelligent features in the event of a power failure.)

As a non-limiting example, more intelligent POTS CPE such as a more intelligent POTS phone that generally conforms to the POTS interface standards but has the ability to detect the status of DSL communication could provide end users with more intelligent policy decision-making as to whether the 0-4 KHz baseband is used for POTS phone calls or DSL data communications. In addition, one skilled in the art will be aware that the subscriber line cards used in central office (CO) switches and digital loop carriers (DLCs) have become more sophisticated. Initially, there were separate line cards for POTS subscriber access lines from 2B1Q U-Interface ISDN BRI subscriber access lines. However, the increasing capability of digital signal processing (DSP) has led to the development of universal line cards in switches and DLCs that use DSPs and other microprocessors together with downloaded software to cause the universal line card to perform the proper functions to emulate either a POTS line card or an ISDN BRI line card. Generally, the central office switches include software that is downloaded to the line cards to cause them to behave according to the services (either POTS or ISDN BRI) that have been requested by and provisioned for the customer. Obviously, such intelligent universal line cards with DSPs and downloadable software might be able to be modified through software to also detect the utilization state of the 0-4 KHz baseband by LDSL modems 2011 and 2027. With the ability to sense the state of DSL communications and with access to customer provisioning databases specifying various priority policies for the subscriber loop 2023, the central office switches could also make intelligent policy decisions about utilizing the 0-4 KHz baseband of the subscriber loop 2023 for POTS calls or DSL data communications. In general, given the expected lifeline nature of the POTS communication the preferred embodiments of the present invention generally allow incoming and outgoing POTS calls to have priority to use of the 0-4 KHz baseband frequency on the subscriber loop. However, other embodiments could certainly select different priority rules.

The development of a modified software for lines cards to detect and act intelligently with respect to the condition of DSL communication in the 0-4 KHz baseband likely would have to go through various standards bodies to be accepted for utilization on multi-vendor universal line cards that are downloaded to and installed in multi-vendor central office switches and multi-vendor digital loop carrier multiplexers. Given the sometimes slow process of working through standards organizations, CPE-based solutions of more intelligent POTS equipment that can sense the state of DSL communications in the POTS 0-4 KHz baseband may be quicker to market. Thus, although intelligent decision-making in new line card software based on sensing the state of DSL activity in the 0-4 KHz frequency range is technically feasible, political acceptance of such an idea might be difficult to obtain given the various competing interest groups involved in standards bodies. Instead, a customer who knows that he has an LDSL modem 2011 also may opt to purchase more intelligent POTS CPE such as one or more phones that can detect the state of DSL communications in the 0-4 KHz baseband. Some non-limiting examples of the behavior of such more intelligent POTS CPE might include a phone that upon going off-hook plays a digitized message to a user indicating that the line is currently being used for DSL data communications. The phone might further prompt the user to press * or # or to press the switch-hook flash to halt or significantly reduce DSL data communication to allow an off hook POTS signal to be passed to the line card in a DLC or central office switch 2033 such that a POTS dial-tone signal is returned to the analog phone.

In addition, on incoming calls an intelligent CPE phone might ring based on the incoming POTS ring signal down the subscriber line 2023. However, upon initially picking up such an intelligent CPE phone, the phone might play a message indicating that continuing to answer the incoming call will stop or significantly degrade DSL data communication. Thus, with such an intelligent CPE phone, taking the handset off-hook does not immediately cause the intelligent phone to send an off-hook signal on the subscriber loop 2023. Only another confirming action by the end user, such as pressing a particular touch tone key may cause the intelligent CPE phone to pass a POTS off hook signal onto the subscriber loop 2023.

Also, a more intelligent phone might generate a local dial tone and collect the compete set of digits needed to complete a phone call before passing any POTS signaling such as off hook and dual-tone multi-frequency (DTMF) dialing to the line card and central office switch 2033. Such an action might well reduce the amount of time that DSL data communications is halted or reduced. One skilled in the art will be aware that many types of POTS call signaling information that is used to inform end users of the status of a call can be generated locally within the CPE instead of being passed over the subscriber loop. For instance, in standard POTS busy signals and ring back tones are passed from the switch 2033 over the subscriber loop 2023 in the 0-4 KHz baseband to the ear-piece of a analog POTS phone 2013. One skilled in the art will be aware that some ISDN phones not only allow an ISDN B-channel to pass such familiar audible signaling information back to an end-user from network generated sources (such as, but not limited to, a central office switch) but also are capable of utilizing the signaling messages from the ISDN D-channel to optionally generate the audible signals in the phone earpiece using local resources of the ISDN CPE as opposed to network-generated audible signals. In a similar vein, an intelligent piece of POTS CPE, which is aware that the subscriber loop 2023 is also used for DSL data communication, may be able to quickly detect a POTS busy signal over the 0-4 KHz baseband of a subscriber loop 2023. However, users normally may expect to listen to one or two repetitions of such a busy signal. Based on various policies, the intelligent POTS CPE could immediately detect the busy signal and disconnect the POTS service to allow DSL data communication to resume in the 0-4 KHz frequency baseband. To meet user expectations, the intelligent CPE could generate more busy signal cycles locally within the intelligent CPE through the audio earpiece of such CPE. Such types of intelligent decision-making and local generation of common audible POTS signals expected by users might improve the data communications performance of DSL.

In addition to audible indications about the state of DSL data communications on the subscriber loop 2023, a more intelligent POTS CPE could provide visual information using various technologies commonly found on consumer electronics such as, but not limited to, light emitting diodes (LEDs), multi-segment alpha-numeric LEDs, and/or liquid crystal displays (LCDs). In addition, a more intelligent piece of POTS CPE could allow a user to enter a destination phone number (or called number) for the PSTN 2035 without actually interrupting the DSL data communications. The phone number would be stored in the local CPE, which might wait until DSL data communications stops or drops below some threshold level. Then the more intelligent CPE would initiate the phone call and ring the local phone at the customer premises when the call was completed to the destination. In some ways such a feature would work similarly to the CLASS feature that continually calls a destination phone number until the call can be completed. However, unlike the CLASS feature that continually tries a call connection to overcome destination number busy or PSTN network busy conditions, a feature implemented in CPE would be acting based on the busy state of the 0-4 KHz POTS baseband frequency channel that is contended for by both DSL data communication service and POTS phone call service.

Moreover, the LDSL modem 2011 at the customer premises 2021 might include such visual indications on the modem using various technologies commonly found on consumer electronics such as, but not limited to, light emitting diodes (LEDs), multi-segment alpha-numeric LEDs, and/or liquid crystal displays (LCDs). Furthermore, the connection between an LDSL modem 2011 at a customer premises 2021 and computers at the customer premises generally provides another input and/or output device for interacting with end users and allowing intelligent policy decision making to arbitrate contention for the 0-4 KHz frequency baseband between basic POTS service and DSL data communications service. Also, the visual and/or audible indicators on more intelligent POTS CPE, the customer premises 2021 LDSL modem 2011, and/or a customer premises 2021 computer can either just provide an initial status indication or can continually be active so long as the 0-4 KHz frequency baseband is utilized in a particular state. Obviously, a computer and associated cathode ray tube (CRT) monitor or liquid crystal display (LCD) monitor provide the ability to convey more information to end users about the state of the use of the 0-4 KHz baseband of the subscriber loop 2023. In addition, a computer would allow an end user to have a sophisticated interface for configuring the LDSL modem 2011 with various policy rules for deciding the arbitration between POTS and DSL for the use of the 0-4 KHz baseband frequency bandwidth on the subscriber loop 2023.

Furthermore, one skilled in the art will be aware that certain data communications protocols expect various responses within certain periods of time or the protocols will time out connections. However, one skilled in the art will be aware that these various protocols are also amenable to a technique of spoofing or "keep-alive" spoofing to prevent the protocol from timing out even though a connection has been temporarily disconnected. One skilled in the art will be aware that equipment has been designed to spoof various LAN (local area network) protocols when applications on two communicating devices were designed to be locally connected but the geographic distance between the two applications was later extended over dial-up modems or various circuit-switched services such as ISDN BRI circuit-switched data. Generally, the toil costs are expensive for long distance phone calls for analog modems (using circuit-switched voice) calls as well as for long distance circuit-switched data calls over an ISDN B-channel. Thus, protocol spoofing is one technique to allow circuit-switched toll calls to be disconnected and reconnected only when needed while still keeping remote locations unaware that connectivity has temporarily terminated between the applications to reduce long distance phone call costs. Such similar spoofing techniques are applicable to LDSL modems 2011 and 2027 to further make the losses in DSL data connectivity less apparent when the 0-4 KHz baseband is used for POTS. Inherently, such spoofing techniques generally are protocol dependent because spoofing involves tricking a protocol into thinking it is receiving the necessary acknowledgements from a remote location, while the acknowledgements are in fact being locally generated by the LDSL modem nearest to the protocol entity (such as but not limited to an application) that is expecting the acknowledgements.

Various spoofing techniques for maintaining connectivity to an Internet service provider (ISP) are known in the art. Often ISP connectivity utilizes the point-to-point protocol (PPP) or various tunneling variants of PPP, such as but not limited to the Layer 2 Forwarding (L2F) protocol, the Point-to-Point Tunneling Protocol (PPTP), and the Layer 2 tunneling Protocol (L2TP). In PPP and PPP variants that are connection-oriented protocols, the Link Control Protocol (LCP) includes an echo-request and echo-reply message that might be spoofed to keep an ISP from disconnecting a user who is currently using the 0-4 KHz baseband for POTS instead of DSL data communication. Also, the link quality monitoring (LQM) mechanism of PPP is one way for an ISP to attempt to detect the online or disconnected status of a PPP or PPP-variant connection. Furthermore, many virtual-circuit packet switching technologies such as, but not limited to, X.25, frame relay, and ATM have various status inquiry functions used to determine when a connection has failed. Also, many connection-oriented packet technologies are at least somewhat loosely based on the HDLC (High-level Data Link Control) protocol. HDLC and HDLC-variant protocols usually include various receiver-ready (RR) messages that expect responses within certain timer constraints. The spoofing provided in the first LDSL modem 2011 and the second LDSL modem 2027 generally would need to spoof the particular mechanism of the protocols used by the end users' computers or equipment as well as the protocols of the data network 2029. Also, because the end user and the end user's computer generally may be aware that DSL data connectivity is intermittently being suspended or reduced as the 0-4 KHz frequency range is used for POTS connectivity, it is possible that drivers in the end user's computer could handle the spoofing to keep sensitive upper layer protocols satisfied even though the DSL data connectivity may be temporarily halted or reduced.

Furthermore, the ability of the LDSL modems 2011 and 2027 to communicate status information over data connections at the customer premises 2021 to an end user's computer(s) as well as over the data network 2029 to peer protocol entities of the user's computers (such as but not limited to application) may allow some higher level protocols to gracefully suspend operations during the time that DSL data communication is stopped or reduced when the 0-4 KHz baseband frequency range is utilized for a POTS phone call. Many more modem protocols, even though they are connection-oriented, are designed with the expectation of operating on wide area networks (WANs) with intermittent network connectivity. Such newer protocols often are more tolerant of and sometimes offer mechanisms to handle short-term and temporary connectivity faults. Thus, these higher layer protocols can sometimes advantageously utilize information about changes in the state of the underlying connectivity (such as, but not limited to, the temporary loss of data connectivity in utilizing the 0-4 KHz frequency range for POTS). In general, the end of utilization of the 0-4 KHz frequency baseband for POTS service allows DSL data communication generally to be restarted within about one second.

Figure 3:
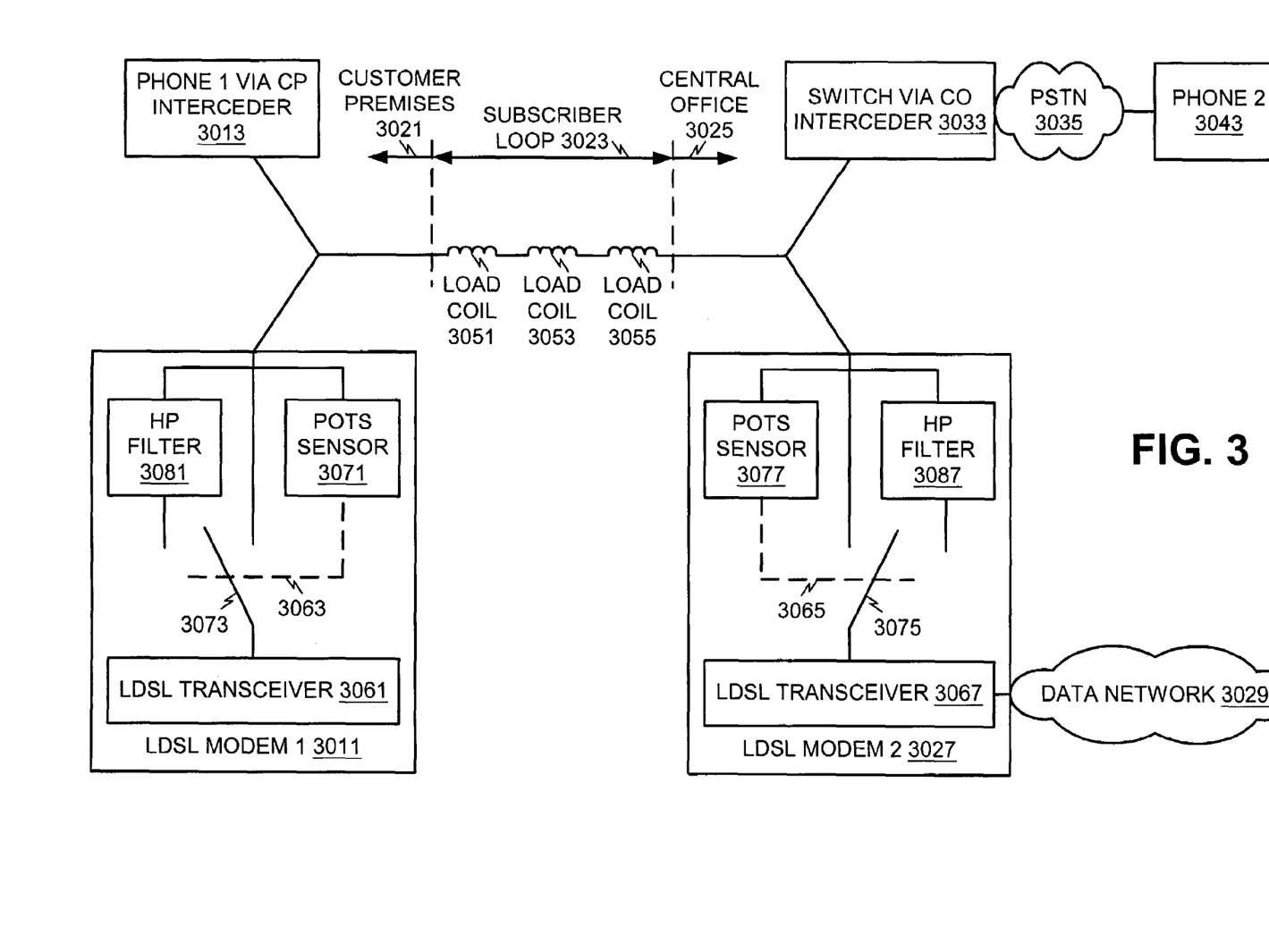
FIG. 3 is a block diagram showing POTS sensors and high-pass (HP) filters in a configuration where DSL communication generally is restricted to bandwidth above 4 KHz when the 0-4 KHz baseband is being used for POTS signaling and/or POTS telephone calls.

Given this basic description of FIG. 2, which includes the use of POTS sensors 2071 and 2077 to determine the state of the 0-4 KHz baseband frequency on the subscriber loop 3023 in arbitrating whether the 0-4 KHz frequency range is used for POTS service or DSL data communication, FIG. 3 shows an additional more complex configuration. In FIG. 3, a first loaded loop digital subscriber line (LDSL) modem 3011 and a first analog POTS phone via a customer premises (CP) interceder 3013 are connected to a subscriber loop 3023 between a customer premises 3021 and a central office 3025. (One skilled in the art will be aware that a line card terminating the network-side of a subscriber loop may also be located in a DLC chassis instead of a central office switch.) On the network-side or CO-side, the subscriber loop 3023 is connected to a second LDSL modem 3027, which is further connected to data network 3029. Commonly data network 3029 utilizes some form of statistical multiplexing in packet switching, but the preferred embodiments of the present invention are not limited to data network 3029 just being a packet-switched network. In addition, subscriber loop 3023 is connected to a switch via a central office (CO) interceder 3033 with the switch being further connected to the PSTN 3035, which commonly is a circuit switched network but is not intended to be limited to such a circuit switching network. The PSTN is connected to a second phone 3043 that is capable of communication with the first analog POTS phone 3013. The second phone 3043 may be connected to the PSTN 3035 through various technologies such as, but not limited to, an analog access line, a digital B-channel of a BRI or PRI ISDN access line, or through a packetized voice gateway.

In FIG. 3, the subscriber loop 3023 comprises at least one load coil arbitrarily shown as load coils 3051, 3053, and 3055. In addition, FIG. 3 shows a further breakdown of the functionality of the first LDSL modem 3011 and the second LDSL modem 3027. In FIG. 3, the first LDSL modem 3011 comprises LDSL transceiver 3061 POTS sensor 3071, and high-pass (HP) filter 3081, while the second LDSL modem 3027 comprises LDSL transceiver 3067, POTS sensor 3077. POTS sensors 3071 and 3077 are connected to subscriber loop 3023 and basically act somewhat similarly to POTS sensors 2071 and 2077 in FIG. 2. However, unlike FIG. 2 the control mechanisms 3063 and 3065 from POTS sensors 3071 and 3077 respectively basically act to control switches 3073 and 3075 respectively in switching between connecting LDSL transceivers 3061 and 3067 either directly to the subscriber loop 3023, when POTS activity is not using the 0-4 KHz frequency baseband, or indirectly through the high-pass (HP) filters 3081 and 3087 before connecting to the subscriber loop 3023, when POTS activity is using the 0-4 KHz frequency baseband. This type of switching allows the DSL data communications to use the entire frequency spectrum (which is about 0-6 KHz in the preferred embodiments of the present invention) of the loaded subscriber loop 3023, when POTS activity is not using the 0-4 KHz frequency baseband. However, when POTS activity is using the 0-4 KHz frequency baseband, the high-pass filters 3081 and 3087 only allow the LDSL transceivers to use the frequency bandwidth above the approximate 0-4 KHz baseband frequency. Also unlike FIG. 2, the first analog POTS phone 3013 is connected through a customer premises (CP) interceder, which effectively can be used to isolate POTS CPE from unexpected signals in the frequency range above 4 KHz that carry DSL data communications. Also, the switch 3033 is connected to the subscriber loop 3023 through a central office (CO) interceder for the same reason of isolating the line card that expects signals in the 0-4 KHz range from the unexpected signals in the frequency range above 4 KHz that carry DSL data communications. Thus, FIG. 3 generally shows a configuration that allows DSL data communication in a reduced frequency bandwidth, which generally relates to a lower channel bit rate capacity according to Claude Shannon's theories, while the 0-4 KHz baseband frequency is used for POTS calls and/or POTS signaling. Therefore, instead of completely halting DSL data communications when POTS activity is using the 0-4 KHz baseband frequency range, the configuration of FIG. 3 generally degrades DSL data communication performance but does not completely halt data communications when the POTS activity is using the 0-4 KHz baseband frequency range. In general, the other descriptions of the functionality of devices and equipment as well as intelligent devices making decisions based on sensing the status and usage of the subscriber loop 3023 apply just as well to FIG. 3 as the descriptions applied to FIG. 2. Also, the POTS sensors 3071 and 3077, the high-pass (HP) filters 3081 and 3087, the switches 3073 and 3075, as well as the control mechanism 3063 and 3065 may or may not be integrated into LDSL modems 3011 and 3027 respectively.

Furthermore, by using some power spectral density (PSD) shaping, the performance of the communications system may be improved in the situation when the POTS baseband is being used for a POTS phone call or POTS signaling, but frequencies above POTS are being used for DSL on a loaded loop. U.S. Pat. No. 6,061,392 to Gordon Bremer and Thomas Bingel, entitled "Apparatus and Method for Communicating Voice and Data between a Customer Premises and a Central Office", filed on Nov. 3, 1997, and issued on May 9, 2000, is incorporated by reference in its entirety herein. In addition, U.S. Pat. No. 6,546,090 to Gordon Bremer and Thomas Bingel, entitled "Apparatus and Method for Communicating Voice and Data between a Customer Premises and a Central Office", filed on Aug. 16, 1999, and issued on Apr. 8, 2003, is incorporated by reference in its entirety herein. Both U.S. Pat. No. 6,061,392 and U.S. Pat. No. 6,546,090 describe a SD shaping technique that is quite applicable to the reduced bandwidth available above the POTS baseband on a loaded loop when the POTS baseband is actually being used for POTS communication.

Thus, the preferred embodiments of the present invention provide advances over the existing technology for loaded loop communication and allow deployment of DSL technology at higher communication rates without the need for reengineering subscriber loops to remove load coils. Such a solution allows telecommunications service providers to offer higher grade service to additional customers without absorbing the costs to rewire the multitude of loaded subscriber loops in the networks of service providers. Furthermore, the preferred embodiments of the present invention will work while still allowing the loaded subscriber loop to support both DSL data communication and POTS service. Various priority arbitration mechanisms can be used to implement policies for deciding when the 0-4 KHz baseband frequency is utilized for DSL service or POTS service. In addition, various techniques can be used to make DSL service appear to be always-on even though DSL service may be halted in some situations of long duration use of the 0-4 KHz baseband frequency for POTS service.

It should be emphasized that the above-described preferred embodiments of the present invention, particularly, any "preferred" preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and are to be protected by the following claims.

Therefore, having thus described the invention, at least the following is claimed:

1. A digital subscriber line (DSL) apparatus comprising:
   logic configured to sense a presence of at least one POTS signal on a subscriber loop that comprises at least one low-pass load coil configured to filter out frequencies above the POTS band;
   logic configured to disconnect a DSL transceiver from the subscriber loop based at least upon the presence of the at least one POTS signal; and
   logic configured to connect a DSL transceiver to the subscriber loop based at least upon cessation of the sensing the presence of the POTS signal.

2. The apparatus of claim 1, wherein the logic configured to temporarily stop digital subscriber line usage does not allow DSL communication in the frequency range above 4 KHz responsive to said at least one POTS signal being sensed.

3. The apparatus of claim 1, wherein protocol spoofing is used to facilitate an appearance of always-on DSL while the DSL transceiver is disconnected from the subscriber loop.

4. The apparatus of claim 1, wherein said at least one POTS signal comprises at least one POTS signaling message.

5. The apparatus of claim 1, wherein said at least one POTS signal comprises a POTS call connection.

6. The apparatus of claim 1, wherein the logic configured to disconnect a DSL transceiver further comprises a switch.

7. The apparatus of claim 1, wherein the apparatus is connected to the subscriber loop without an interceder being connected to the subscriber loop between the apparatus and POTS equipment.

8. The apparatus of claim 1, further comprising:
   logic configured to sense an open switching interval on the subscriber loop, the open switching inverval conveying a Custom Local Area Signaling Services (CLASS) message;
   logic configured to disconnect the DSL transceiver from the subscriber loop during the open switching interval; and
   logic configured to connect the DSL transceiver to the subscriber loop after the open switching interval.

9. A method of providing digital subscriber line (DSL) service the method comprising:

sensing a presence of at least one POTS signal on a subscriber loop that comprises at least one low-pass load coil configured to filter out frequencies above the POTS band;

disconnecting a DSL transceiver from the subscriber loop based at least upon the presence of the at least one POTS signal; and connecting a DSL transceiver to the subscriber loop based at least upon cessation of the sensing the presence of the POTS signal.

10. The method of claim 9, wherein the step of temporarily stopping digital subscriber line usage operates rapidly and automatically to turn on DSL communication in at least a frequency range used for native POTS responsive to said at least one POTS signal not being sensed, and wherein the step of controlling digital subscriber line usage operates rapidly and automatically to turn off DSL communication in at least the frequency range used for native POTS responsive to said at least one POTS signal being sensed.

11. The method of claim 9, wherein protocol spoofing is used to facilitate an appearance of always-on DSL while the DSL transceiver is disconnected from the subscriber loop.

12. The method of claim 9, wherein said at least one POTS signal comprises at least one POTS signaling message.

13. The method of claim 9, wherein said at least one POTS signal comprises a POTS call connection.

14. The method of claim 9, further comprising the step of terminating the subscriber loop with an impedance.

15. The method of claim 9, wherein the step of temporarily stopping digital subscriber line usage further comprises the step of switching.

16. The method of claim 9, wherein the apparatus is connected to the subscriber loop without an interceder being connected to the subscriber loop between the apparatus and POTS equipment.

17. The method of claim 9, further comprising:

sensing an open switching interval on the subscriber loop, the open switching inverval conveying a Custom Local Area Signaling Services (CLASS) message;

disconnecting the DSL transceiver from the subscriber loop during the open switching interval; and connecting the DSL transceiver to the subscriber loop after the open switching interval.

18. The method of claim 9, further comprising:

detecting activity of the DSL transceiver in frequencies below 4 kHz; and notifying a user of the DSL activity in response to the presence of the at least one POTS signal and detected activity of the DSL transceiver in frequencies below 4 kHz.

19. The method of claim 18, wherein the at least one POTS signal is an off-hook signal, and further comprising:

receiving a keypress from the user in response to the notifying; and instructing the DSL transceiver to reduce activity in frequencies below 4 kHz, responsive to receiving the keypress.

20. The method of claim 18, wherein the at least one POTS signal is a ring signal, and further comprising:

receiving a keypress from the user in response to the notifying; and instructing the DSL transceiver to reduce activity in frequencies below 4 kHz, responsive to receiving the keypress.

21. A digital subscriber line (DSL) apparatus comprising:

logic configured to sense a presence of at least one POTS signal on a subscriber loop having characteristics of filtering out frequencies above a POTS band; and logic configured to disconnect a DSL transceiver from the subscriber loop based at least upon the presence of the at least one POTS signal; and logic configured to connect a DSL transceiver to the subscriber loop based at least upon cessation of the sensing the presence of the POTS signal.

22. The apparatus of claim 21, wherein protocol spoofing is used to facilitate an appearance of always-on DSL while the DSL transceiver is disconnected from the subscriber loop.

* * * * *